United States Patent

Ridenour

Patent Number: 5,851,110
Date of Patent: Dec. 22, 1998

[54] BURNER BOX WITHOUT MANIFOLD RETURN

[75] Inventor: Ralph G. Ridenour, Mansfield, Ohio

[73] Assignee: Universal Tubular Systems, Inc., Mansfield, Ohio

[21] Appl. No.: 877,365

[22] Filed: Jun. 17, 1997

Related U.S. Application Data

[63] Continuation-in-part of Ser. No. 707,638, Sep. 5, 1996.

[51] Int. Cl.$^6$ .................................................. F23Q 9/00
[52] U.S. Cl. ........................... 431/278; 431/256; 431/266; 126/39 E; 126/39 N; 137/883; 137/887; 251/65
[58] Field of Search ...................................... 431/256, 265, 431/266, 278, 279, 280, 281; 126/39 N, 39 R, 39 E, 39 A, 39 G; 361/253; 137/883, 887; 251/65; 285/382.4, 382.5

[56] References Cited

U.S. PATENT DOCUMENTS

| | | | |
|---|---|---|---|
| 2,005,792 | 6/1935 | Leins | 126/39 R |
| 2,146,660 | 2/1939 | Swartz | 431/256 |
| 2,417,977 | 3/1947 | French | 127/39 N |
| 2,617,404 | 11/1952 | Prather . | |
| 2,658,987 | 11/1953 | Ogden . | |
| 2,675,796 | 4/1954 | Van Helden . | |
| 2,969,445 | 1/1961 | Mitchell | 251/65 |
| 3,930,298 | 1/1976 | Ridenour . | |
| 3,932,112 | 1/1976 | Garshelis | 431/255 |
| 3,977,710 | 8/1976 | Ridenour . | |
| 4,126,929 | 11/1978 | Ridenour . | |
| 4,142,843 | 3/1979 | Kish | 285/382.4 |
| 4,681,084 | 7/1987 | Grech . | |
| 4,871,199 | 10/1989 | Ridenour et al. . | |
| 5,044,352 | 9/1991 | Lok . | |
| 5,209,217 | 5/1993 | Beach et al. . | |
| 5,608,378 | 3/1997 | McLean et al.. | 219/518 |

*Primary Examiner*—James C. Yeung
*Attorney, Agent, or Firm*—Pearne, Gordon, McCoy & Granger LLP

[57] ABSTRACT

A tube assembly for a gas range includes a small aluminum manifold block, valve assemblies adapted to regulate flow of gas from the manifold block to the burners, and burner orifices adapted to control flow of gas to the burners. Aluminum valve supply tubes each have a first end staked to an associated outlet of the manifold block and a second end connected to an inlet of an associated one of the valve assemblies. Aluminum burner tubes each have a first end connected to an outlet of an associated one of the valve assemblies and a second end connected to an associated one of the burner orifices. Two or more small manifold blocks can be interconnected by aluminum manifold supply tubes. The manifold supply tube can be easily bent to position the manifold blocks in any desirable position. An igniter assembly includes a pin extending from a stem of the valve assembly and a contactless position sensor. The sensor is activated by the pin in the full-on position which in turn activates a spark module at the burner to ignite the burner.

26 Claims, 5 Drawing Sheets

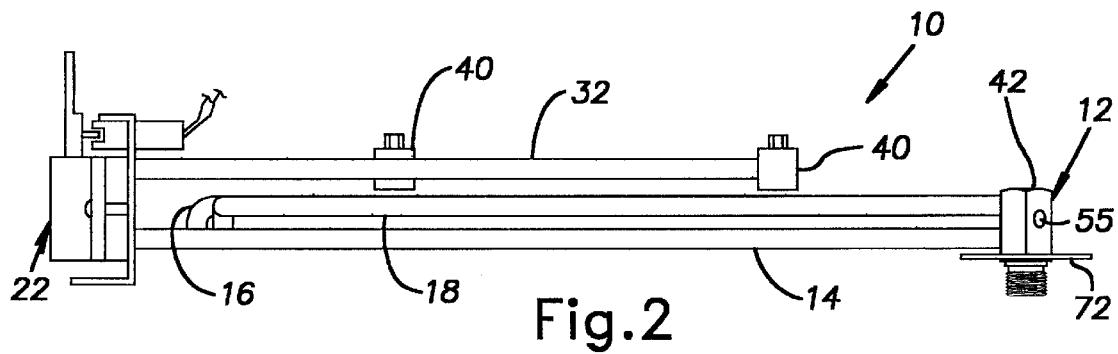
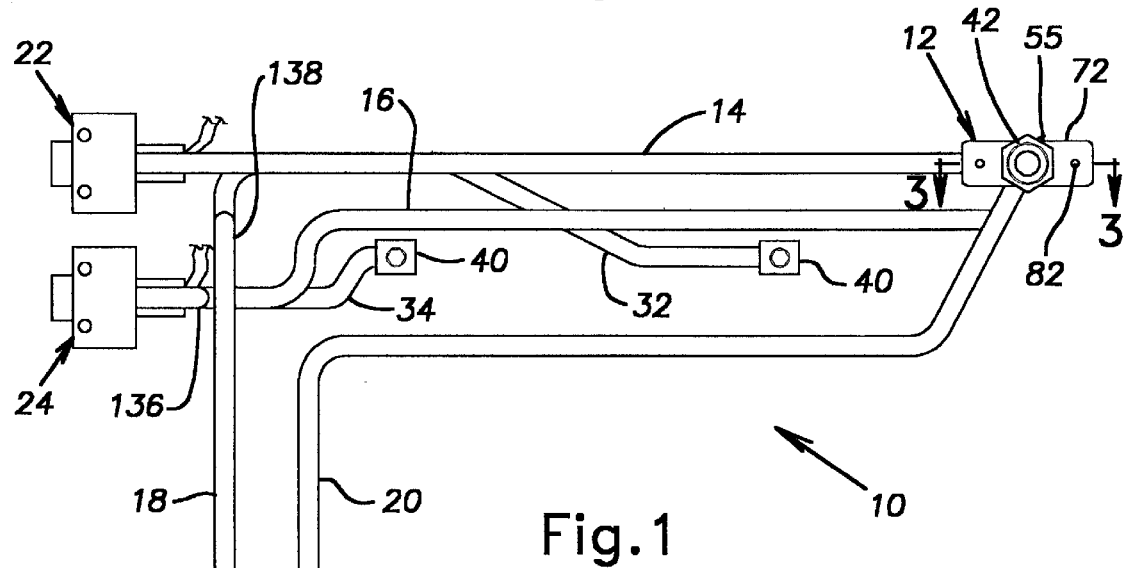
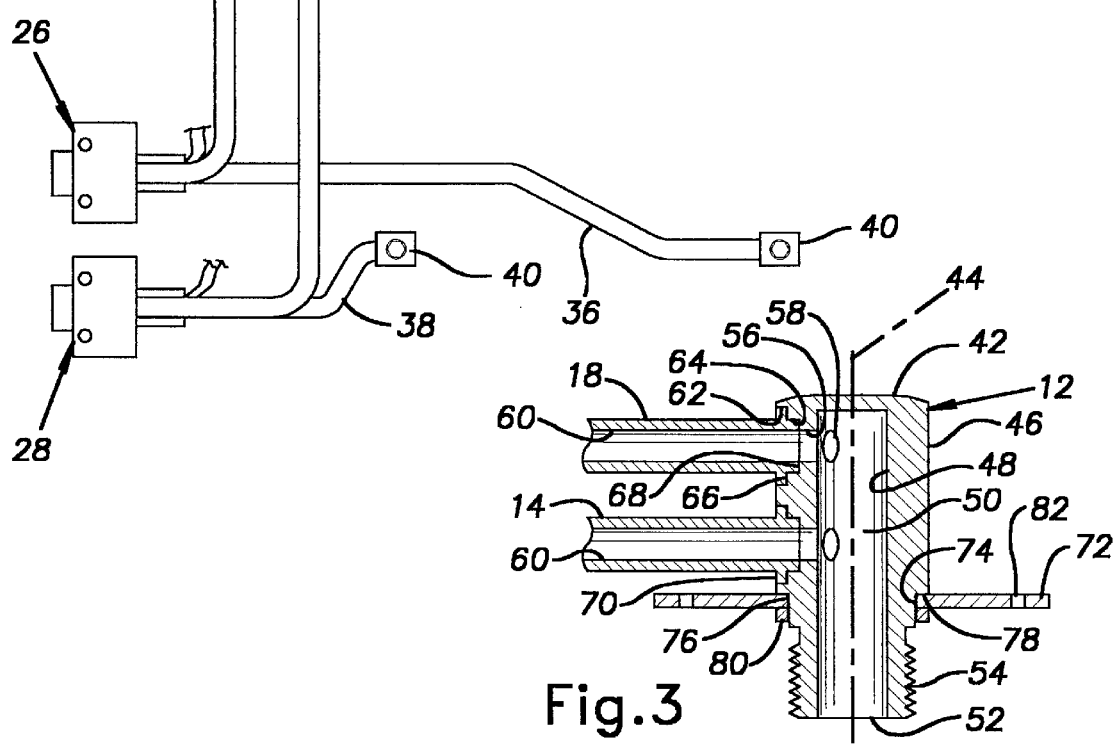

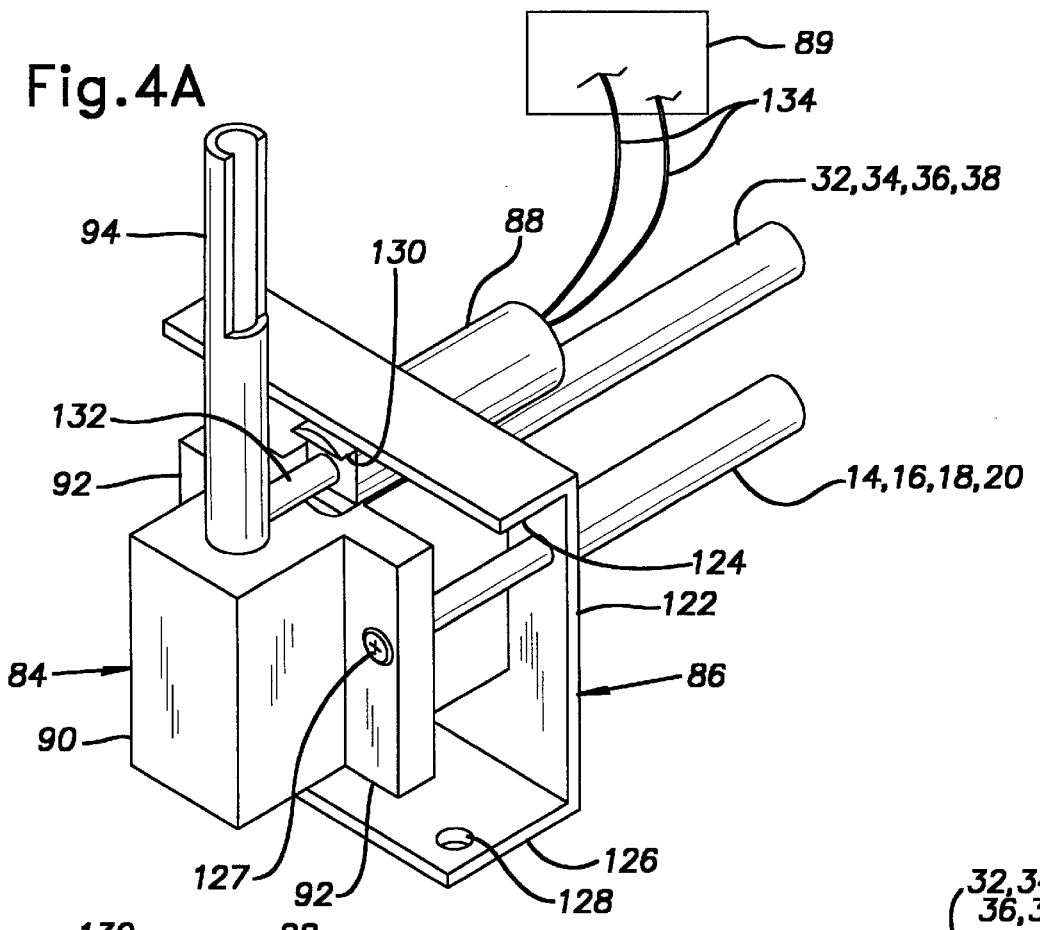
Fig.4A
Fig.4C
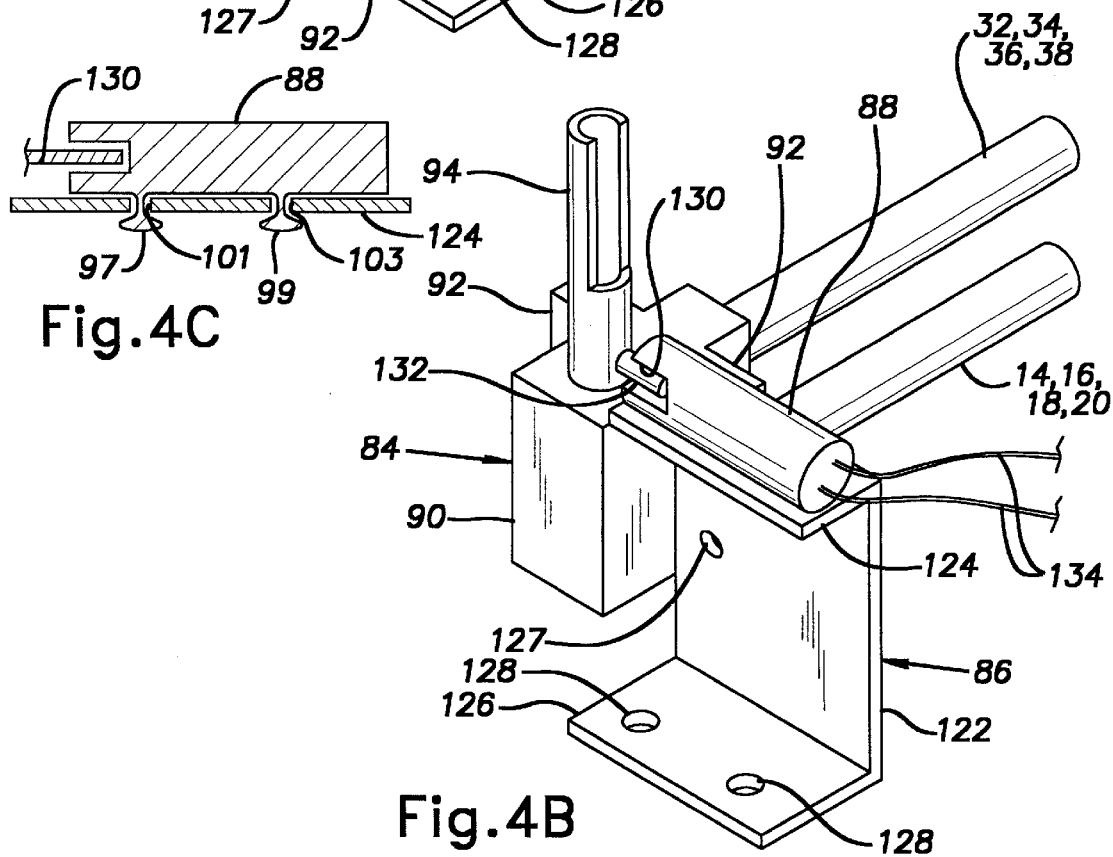
Fig.4B

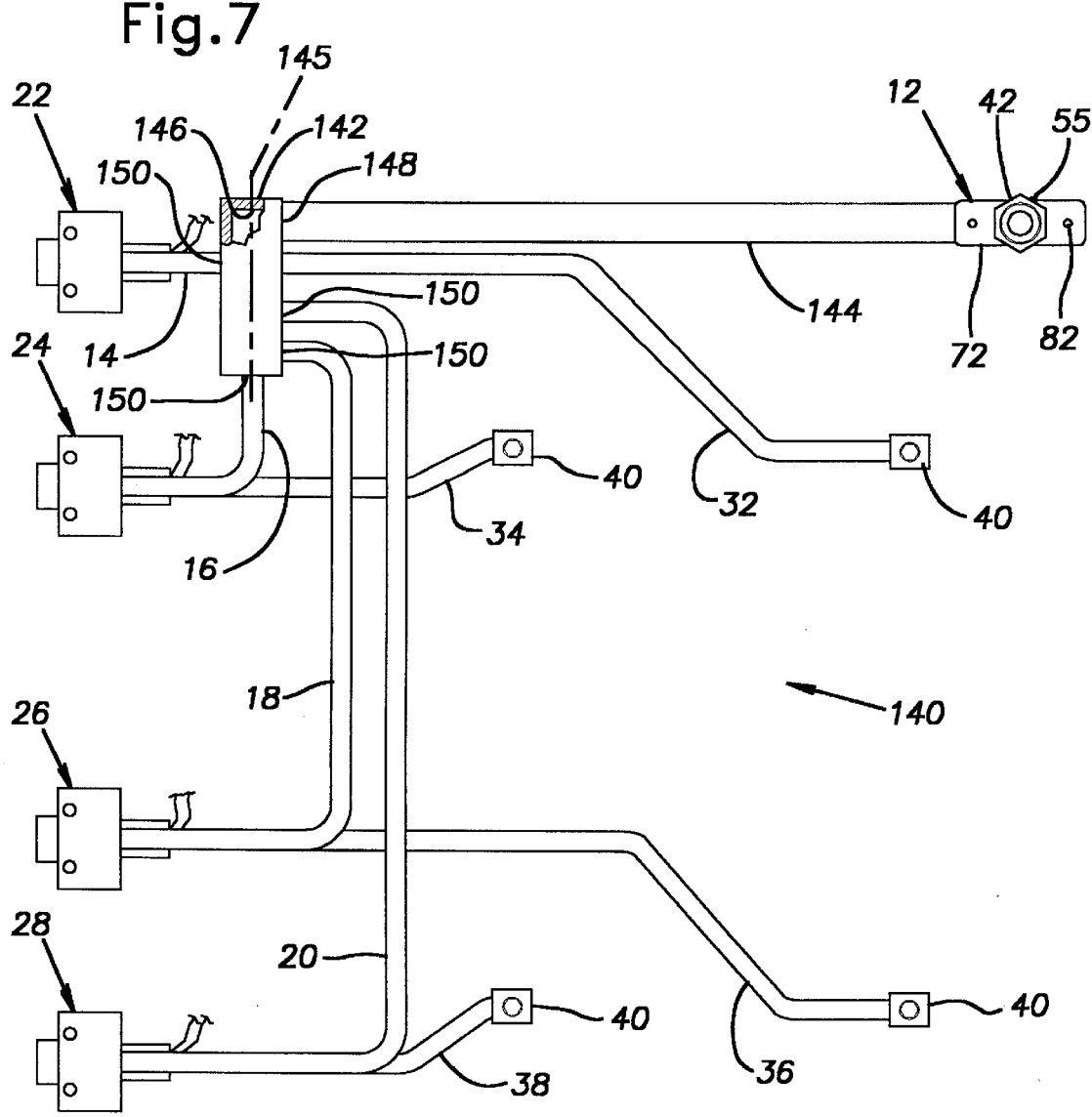

BURNER BOX WITHOUT MANIFOLD RETURN

This application is a continuation-in-part of application Ser. No. 08/707,638, filed on Sept. 5, 1996.

BACKGROUND OF THE INVENTION

1. Field of the Invention

The present invention generally relates to a tube assembly for a burner box of a gas range and, more particularly, to a lightweight tube assembly having a manifold block.

2. Description of Related Art

Gas ranges or stoves typically have a plurality of manually operable valves which respectively regulate the flow of gas through burner tubes to a plurality of burners. The burner tubes are typically connected to the valves and the burners with flare fittings. The valves are typically mounted directly to the side of a manifold tube and spaced apart along the length of the manifold tube. One end of the manifold tube is connected to a gas supply and the other end is flared or sealed so that the manifold tube distributes gas to the valves with an acceptable pressure drop.

These gas distribution assemblies are prone to frequently develop leaks at several different locations. Leaks can develop in the manifold tube due to cracks at the valve connections. Therefore, the manifold tube typically has a relatively large wall thickness and/or is formed from steel. Steel manifold tubes, however, are particularly prone to weld seam leaks, rusting, and bending problems. Leaks also develop due to human error in making the flare fitting connections such as, for example, nut and sleeve problems or loose flares. Leaks can also develop at the flared ends of the tubes which crack over time due to bad tubular seams.

Additionally, these gas distribution systems are heavy because the manifold tubes are relatively large so that they can extend past each of the valves. Typically, the manifold tube extends for nearly the entire width of the gas range. The weight is even greater when the manifold tubes are steel. Furthermore, the manifold tubes may interfere with access to other components of the gas range because they can cannot be easily positioned elsewhere, and usually cannot be split or easily separated. Accordingly, there is a need in the art for an improved gas distribution system for a gas range.

Another problem with the prior art devices is the igniter. Typically spark ignition systems for gas stoves use some type of microswitch mounted on the stems of a gas valve that controls the flow of gas to the burners. When the valve stem is rotated to a predetermined position, contact points on a microswitch touch, closing a circuit and activating the spark module. 115 volts AC is usually present at the microswitch contact points.

A lot of problems have been created with this method. First, AC voltage is present close to the stem where the operators hand is located. Second, the microswitch is subject to damage due to cooking material such as acidic liquids like tomato juice possibly boiling over the pan and flowing onto the cooktop and onto the microswitch which is located underneath a hole created in the cooktop for the stem penetration. Third, microswitches in the small size required are not always that reliable.

SUMMARY OF THE INVENTION

The present invention provides an improved tube assembly for a gas range which overcomes at least some of the above-noted problems of the related art. The tube assembly includes a manifold block adapted for connection to a source of gas and formed of a lightweight material, value assemblies adapted to regulate flow of gas from the manifold block to the burners, and burner orifices adapted to control flow of gas to the burners. Supply tubes each have a first end connected to the manifold block and a second end connected to an inlet of an associated one of the valve assemblies. Burners tubes each have a first end connected to an outlet of one of the valve assemblies and a second end connected to an associated one of the burner orifices.

Preferably, the manifold block, the supply tubes, and the burner tubes are each formed of an aluminum alloy to minimize weight. The manifold block is preferably made from an extrusion to reduce manufacturing cost. It is noted that use of the manifold block eliminates tube weld seams which can crack or break. The supply tubes are preferably staked to the manifold block to ease connection and eliminate leaks. The valve supply tubes and burner tubes are preferably connected to the valve assemblies with either a stake joint, a double-bead joint, or an o-ring joint to eliminate flare fitting assembly errors and flare tube ends which can crack. It is particularly noted that the tube assembly is relatively light weight, can be easily manufactured and assembled, and can be produced at a reduced cost.

In preferred embodiments of the present invention, additional manifold blocks are utilized. The manifold blocks are interconnected with tubing which is preferably staked to the manifold blocks to prevent leaks. The tubing is easily bent so that the manifold blocks can be located in any desirable location to avoid interference with access to other components of the gas range.

The present invention eliminates the need for a microswitch thus making the system more reliable. It utilizes a contactless position sensor that is sealed or encapsulated in a housing so that it is impervious to dust, dirt, food and other contaminants. The sensor is activated by a pin mounted in a valve stem. This type of ignition device is highly reliable, cost effective and available in large quantities. Optionally, the body of the sensor may be attached to a mounting device with clips or other easily installed devices which snap or force fit in place. Microswitches usually require close tolerances and adjustments. The present system would not be sensitive to positional adjustments.

BRIEF DESCRIPTION OF THE DRAWINGS

These and further features of the present invention will be apparent with reference to the following description and drawings, wherein:

FIG. 1 is a bottom plan view of a tube assembly for a gas range according to the present invention;

FIG. 2 is an elevational view of the tube assembly of FIG. 1;

FIG. 3 is an enlarged elevational view, in cross-section, of a manifold block of the tube assembly taken along line 3—3 of FIG. 1;

FIG. 4A is an enlarged perspective view of a burner valve and switch assembly of the tube assembly of FIG. 1;

FIG. 4B is an enlarged perspective view of a variation of the burner valve and switch assembly of FIG. 4A;

FIG. 4C is a side elevation of an igniter sensor in a mounting bracket;

FIG. 7 is a bottom plan view of a tube assembly for a gas stove according to a second embodiment of the present invention.

DETAILED DESCRIPTION OF THE PREFERRED EMBODIMENT

Figure 5:
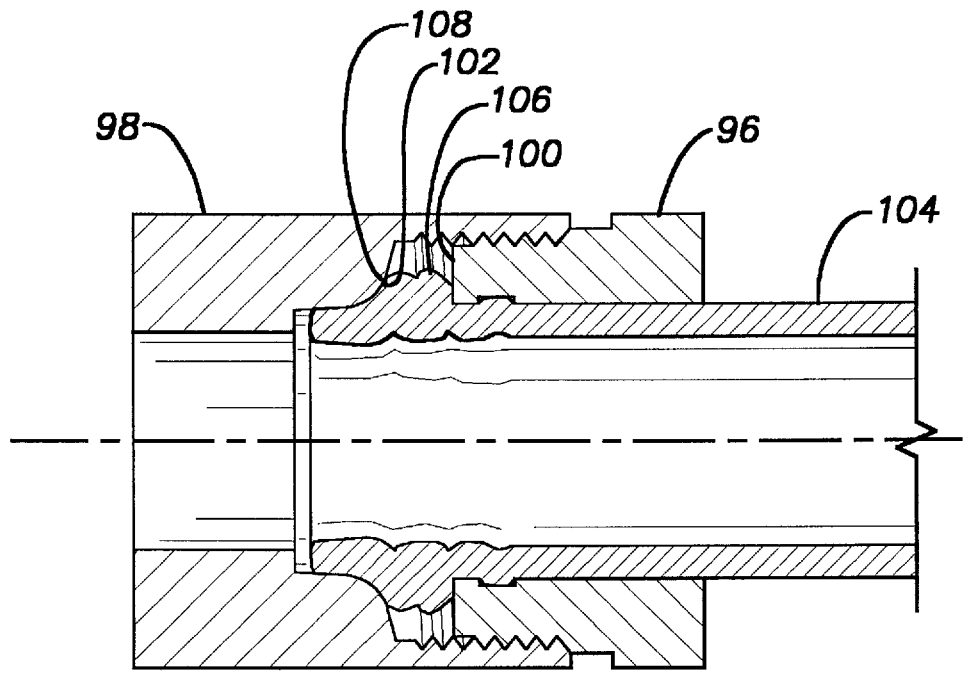
FIG. 5 is an enlarged elevational view, in cross-section, of a double-bead tube joint.

FIGS. 1 and 2 illustrate a tube assembly 10 according to the present invention for a burner box of a gas range, stove, or the like. The tube assembly 10 includes a small manifold block 12, valve supply tubes 14, 16, 18, 20, burner valve assemblies 22, 24, 26, 28, burner tubes 32, 34, 36, 38, and burners orifices 42. The illustrated embodiment is for a gas range having four burners in a generally rectangular pattern. The tube assembly 10, however, can be adapted to accommodate any number or pattern of burners within the scope of the present invention.

As best shown in FIGS. 1–3, the small manifold block has an elongate body 42 with a vertically extending central axis 44. The manifold block 12 is preferably formed of a light weight material such as, for example, an aluminum alloy and is sized as small as possible to minimize the total weight of the tube assembly 10. An outer-side surface 46 of the body 42 has the shape of a polygon such as the illustrated hexagon. The manifold block 12 can be advantageously machined from an extruded bar of aluminum alloy.

A blind bore 48 longitudinally extends through a first or lower end of the body 42 to form a central interior cavity 50. The interior cavity 50 has an inlet 52 at a lower or first end and is closed at a second or upper end. The lower end of the body 52 is provided with external threads 54 sized for mating with a pressure regulator of a gas supply line so that the inlet 52 is in fluid flow communication the a gas supply line. Preferably, a pressure tap 55 is provided for the internal cavity 50.

The body 42 also has radially extending bores 56 which are substantially perpendicular to the central axis 44 and the outer-side surface 46. The bores open 56 into the interior cavity 50 to form outlets 56 of the interior cavity 50. The illustrated embodiment has four outlets 58. Two of the outlets are circumferentially aligned with a first flat portion of the body outer-side surface 46 and are longitudinally spaced apart one above the other. The other two outlets are circumferentially aligned with a second flat portion of the body outer side surface 46, adjacent to the first flat portion, and are longitudinally spaced apart one above the other. The valve supply tubes 14, 16, 18, 20 are mated to the body 42 at the bores 36 so that the outlets 58 are in fluid flow communication with respective interior passages 60 of the valve supply tubes 14, 16, 18, 20.

Preferably, the valve supply tubes 14, 16, 18, 20 are staked to the body 42 of the manifold block 12. Accordingly, each of the bores 56 are provided with a concentric first and second counter-bores 62, 64. The first counter-bore 62 extends from the outer-side surface 46 of the body 42 and through a portion of the body to form a first shoulder 66. The second counter-bore 64 is smaller than the first counter-bore 62 and is sized to receive the outer diameter of one of the valve supply tubes 14, 16, 18, 20. The second counter-bore 64 extends from the first shoulder 66 and through a portion of the body to form a second shoulder 68. The bore 56 is smaller than the second counter-bore 64 and extends from the second shoulder 68 to the outlet 58. An end of the respective valve supply tube 14, 16, 18, 20 extends into the second bore 64 and against the second shoulder 68 and has a radially outwardly deformed portion 70 occupying the first counter-bore 62. The deformed portion 70 of the valve supply tube 14, 16, 18, 20 engages the outer-side surface 46 of the body 42, the periphery of the first counter-bore 62 of the body 42, and the first shoulder 66 of the body 42 to form a high-pressure gas-tight seal therebetween. For a more detailed description of the stake joint see U.S. Pat. No. 3,930,298 the disclosure of which is expressly incorporated herein in its entirety by reference. It is also noted that the stake joint can include variations such as those disclosed in U.S. Pat. No. 3,977,710 and 4,126,929, the disclosures of which are expressly incorporated herein in their entireties by reference.

The manifold block 12 also includes a rectangularly-shaped mounting plate or bracket 72 which is generally planar or flat. The mounting bracket 72 includes a central opening 74 sized to receive the body 42 therethrough. The body 42 includes a cylindrically-shaped mounting portion 76 located between the polygonally-shaped outer-side surface 46 and the external threads 54 of the lower end. The mounting portion 76 has a diameter smaller than an a diameter formed by the outer-side surface 46 to form a downward facing shoulder or abutment 78. The mounting portion 76 extends through the central opening 74 of the mounting bracket 72. An internally threaded retaining nut 80 cooperates with external threads on the mounting portion 76 to clamp the mounting bracket 72 against the abutment 78. The mounting bracket 72 is also provided with openings 82 sized for receiving fasteners therein to secure the manifold block 12 to a desired surface such as, for example, to the bottom wall of a burner box of the gas range.

The illustrated embodiment includes four burner valve assemblies 22, 24, 26, 28 which are aligned side by side so that they can be located across, for example, the front of the burner box of the gas range. As best shown in FIG. 4A, each valve assembly 22, 24, 26, 28 includes a manual burner valve 84, a mounting bracket 86, and a ceramic igniter sensor 88. The burner valve 84 includes a main body 90 having a pair of outwardly extending flanges 92 to form a generally t-shaped cross-section. Preferably, the body 90 is formed from a light weight material such as, for example, an aluminum alloy.

A known valve mechanism is located within the body 90 and is manually controlled by rotation of a shaft 94 extending from the top of the body 90. The shaft 94 is adapted to mount a control knob (not shown) thereto in a conventional manner. One of the valve supply tubes 14, 16, 18, 20, and one of the burner tubes 32, 34, 36, 38 are respectively connected to an inlet and an outlet of the valve mechanism at the rear side of the body 90. The valve supply tube 14, 16, 18, 20 is substantially parallel to and directly below the burner tube 32, 34, 36, 38 at the connections. The connections can be of any known type for providing a high-pressure gas-tight seal therebetween. Preferably, the connections are either a stake joint, as described above, a double-bead joint, or a o-ring joint. It is noted that supply tube 14, 16, 18, 20 and the burner tube 32, 34, 36, 38 can alternatively have the same or a different type of connection.

FIG. 5 illustrates an example of a double-bead joint which includes first and second threaded fitting members 96, 98 with first and second lateral shoulders 100, 102 respectively. The tube 104, which can be any one of the valve supply tubes 14, 16, 18, 20 or burner tubes 32, 34, 36, 38, is provided with first and second annular beads 106, 108. The fitting members 96, 98 are threaded together with the annular beads 106, 108 of the tube 104 axially compressed so that a seal is formed between the second annular bead 108 and the second shoulder 102 on the second fitting member 98. The large extent to which the annular beads 106, 108 may be axially compressed assures a good fluid-tight seal despite the variable amount of torque applied to the fitting members 96, 98. See U.S. Pat. No. 4,871,199, the disclosure of which is expressly incorporated herein in its entirety by reference, for a more complete description of double-bead joints.

Figure 6:
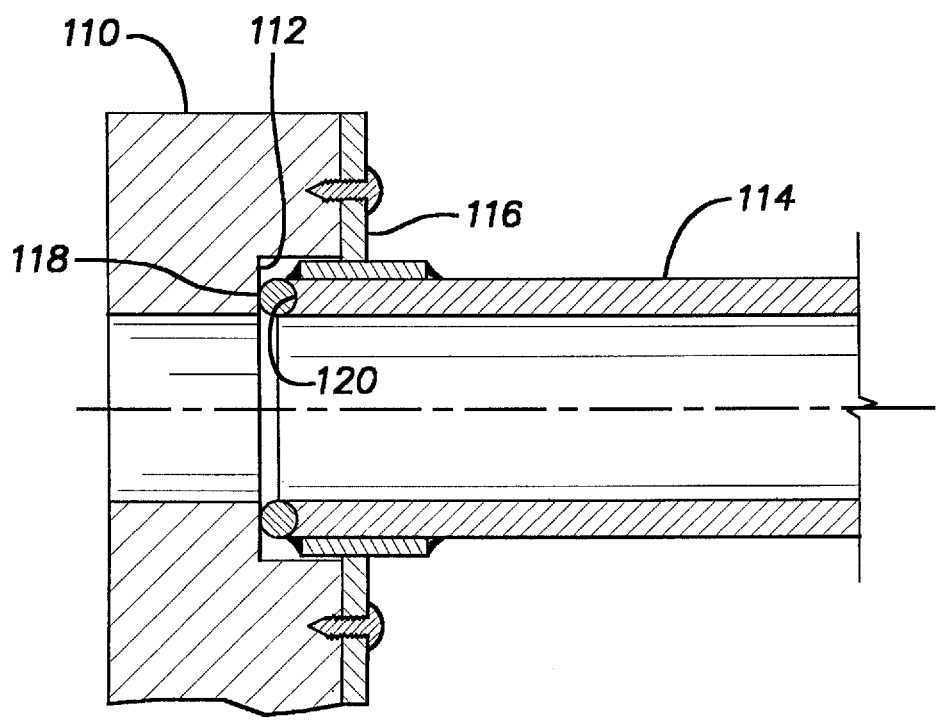
FIG. 6 is an enlarged elevational view, in cross section, of an o-ring tube joint.

FIG. 6 illustrates an example of an o-ring joint which includes a fitting member 110 with a lateral shoulder 112. The tube 114, which can be any one of the valve supply tubes 14, 16, 18, 20 or burner tubes 32, 34, 36, 38, is provided with a mounting bracket 116 secured thereto. The mounting bracket 116 is attached to the fitting member 110 with an o-ring 118 axially compressed between the end 120 of the tube 114 and the shoulder 112 of the fitting member 110 so that a gas-tight seal is formed between the end 120 of the tube 114 and the shoulder 112 the fitting member 110. The o-ring 118 preferably comprises a high temperature material such as, for example, silicone. The illustrated o-ring joint is exemplary of many different types and variations of o-ring joints which can be utilized with the present invention.

As best shown in FIG. 4A, the mounting bracket 86 is generally c-shaped in cross-section having a generally vertical main web 122 and top and bottom flanges 124, 126 extending in one direction from opposite ends of the main web 122. The top flange 124 extends a shorter distance from the main web 122 than the bottom flange 126. The bottom flange 126 is provided with openings 128 for receiving fasteners to mount the burner valve assembly 22, 24, 26, 28 to a desired surface such as, for example, to the bottom of the gas range burner box. The mounting bracket preferably a light weight material such as, for example an aluminum alloy.

The burner valve body 90 extends between the flanges 124, 126 of the mounting bracket 86 with the rear surface of the burner valve body 90 engaging the front surface of the mounting bracket main web 122. The burner valve body 90 is secured to the mounting bracket 86 by threaded fasteners 127 which extend between the flanges 92 of the burner valve body 90 and the main web 122 of the mounting bracket 86. The main web 122 of the mounting bracket 86 is provided with openings 128 for the valve supply tube 14, 16, 18, 20 and the burner tube 32, 34, 36, 38 to pass through the main web 122 to the burner valve body 90.

The igniter sensor 88 passes through an opening in the main web 122 of the mounting bracket 86 above and generally parallel to the burner tube 32, 34, 36, 38 and is secured to the mounting bracket 86. A sensing end of the igniter sensor 88 is located adjacent to the burner valve shaft 94. The sensing end of the igniter sensor 88 is provided with a notch 130 for receiving a pin 132 extending from the shaft 94 to sense when the rotational position of the shaft 94 indicates that a burner should be ignited. The pin 32 may be made of a ferrous or non-ferrous material. It is generally perpendicular to the shaft 94 and rotates with it. When the shaft 94 is turned to the ignite position, the pin 132 is in a position to activate the igniter sensor 88 which, in turn, activates the spark module 89. The igniter sensor 88 may be a hall-effect sensor, a tuned R.F. circuit, an inductance or capacitance circuit and any other suitable device that does not require a physical contact. Thus, if food or other contaminants cover the igniter sensor 88 and pin 132, the unit will still function correctly. The igniter sensor 88 is electrically connected by wires 134 to a burner igniter which ignites the desired burner upon receiving signal from the igniter sensor 88.

A variation of the burner valve assembly of FIG. 4A is shown in FIG. 4B wherein like reference numbers are used for like structure. The burner valve assembly is as described above except that the burner valve 84 extends beside the main web 122 of the mounting bracket 86 with a single flange 92 of the body 90 extending behind the rear surface of the main web 122 of the mounting bracket 86. The valve supply tube 14, 16, 18, 20 and the burner tube 32, 34, 36, 38, therefore, do not pass through the main web 122 of the mounting bracket 86. The igniter sensor 88 extends laterally across the top surface of the top flange 124 of the mounting bracket 86 generally perpendicular to the valve supply tube 14, 16, 18, 20 and the burner tube 32, 34, 36, 38. The igniter sensor 88, therefore, also does not pass through the main web 122 of the mounting bracket 86.

FIG. 4C illustrates that snap-in tabs 97 and 99 can extend through a mounting bracket 124 which has openings 101 and 103. In this way, the igniter sensor 88 can be easily removed and replaced. Other quick connect and disconnect devices are well known in the art.

As best shown in FIGS. 1–3, the valve supply tubes 12, 14, 16, 18 extend from the small manifold block 12 to the valve assemblies 22, 24, 26, 28. The valve supply tubes 12, 14, 16, 18 are preferably bent in a pattern which minimizes the total number of bends and minimizes the total amount of tube required, and therefore, the total weight of the tube assembly 10. The valve supply tubes 12, 14, 16, 18 preferably have a relatively small outside diameter such as, for example, about ¼ inch and preferably comprise a light-weight and malleable material suitable for bending, stake joints, and/or double bead joints such as for example, a soft aluminum alloy.

The supply tubes 14, 16, 18, 20 of the illustrated embodiment extend from the small manifold block 12, which is positioned to be located near a right-rear corner of the burner box, to the four burner valve assemblies 22, 24, 26, 28, which are positioned to be located from right-to-left across the front of the burner box. The first valve supply tube 14 horizontally extends from one of the lower outlets 58 of the manifold block 12 to the first valve assembly 22, which is located to be near the right-front corner of the burner box. The second valve supply tube 16 horizontally extends from one of the upper outlets 58 of the manifold block 12 above the fourth valve supply tube 20. A downward bend 136 allows the second valve supply tube 16 to horizontally extend to the second valve assembly 24, which is located to be near the right-front center of the burner box. The third valve supply tube 18 horizontally extends from the other upper outlet 58 of the manifold block 12 above the first supply tube 14. A downward bend 138 allows the third supply tube 18 to horizontally extend to the third valve assembly 26, which is located to be near the left-front center of the burner box. The fourth valve supply tube 20 horizontally extends from the other lower outlet 86 of the manifold block, below the second valve supply tube 16, to the fourth valve assembly 28, which is located to be near the left-front corner of the burner box.

The burner tubes 32, 34, 36, 38 extend from the burner valve assemblies 22, 24, 26, 28 to the burner orifices 40. The burner orifices 40 are attached to the burner tubes 32, 34, 36, 38 in a conventional manner. The burner tubes 32, 34, 36, 38 are preferably bent in a pattern which minimizes the total number of bends and minimizes the total amount of tube required, and therefore, the total weight of the tube assembly 10. The burner tubes 32, 34, 26, 38 preferably have a relatively small outside diameter such as, for example, about ¼ inch and preferably comprise a light-weight and malleable material suitable for bending, stake joints, and/or double bead joints such as for example, a soft aluminum alloy.

The burner tubes 32, 34, 36, 38 of the illustrated embodiment extend to the four burner orifices 40 which are arranged in a generally rectangular pattern to be attached to left and right rear burners and left and right front burners of the gas range. The first burner tube 32 horizontally extends from the first valve assembly 22, above the first valve supply tube 14, to the burner orifice 40 be attached to the right-rear burner of the gas range. The second burner tube 34 horizontally extends from the second valve assembly 24, above the second valve supply tube 16, to the orifice to be attached to the right-front burner of the gas range. The third burner tube 36 horizontally extends from the third valve assembly 26, above the third valve supply tube 18, to the third orifice 40 to be attached the left-rear burner of the gas range. The fourth burner tube 38 horizontally extends from the fourth valve assembly 28, above the fourth valve supply tube 20, to the fourth burner orifice 40 to be attached to the left-front burner of the gas range.

FIG. 7 illustrates a tube assembly 140 according to a second embodiment of the present invention wherein like reference number are used for like structure. The tube assembly 140 is the same as the tube assembly 10 according to the first embodiment described above except that a transversely extending intermediate or second manifold block 142 is located between the small or first manifold block 12 and the burner valve assemblies 22, 24, 26, 28. Accordingly, the valve supply tubes 14, 16, 18, 20 are each bent into a different configuration than that of the first embodiment.

A manifold supply tube 144 extends from a single outlet 56 (FIG. 3) of the small manifold block 12 to the intermediate manifold block. The manifold supply tube 144 of the illustrated embodiment is substantially straight. The manifold supply tube 144 is preferably staked to the small manifold block 12 as described above. The manifold supply tube 144 preferably has an outside diameter larger than the valve supply tubes and the burner tubes 32, 34, 36, 38 such as, for example, about twice as large or about ½ inch. The manifold supply tube 144 preferably comprises a light-weight and malleable material suitable stake joints such as for example, a soft aluminum alloy.

The intermediate manifold block 142 is a generally elongate block having a generally rectangular cross-section and a substantially horizontal and laterally extending central axis 145. The intermediate manifold block 142 is preferably formed of a light weight material such as, for example, an aluminum alloy and is sized as small as possible to minimize the total weight of the tube assembly 140. The intermediate manifold block 142 can be advantageously formed from a square bar of aluminum alloy.

The intermediate manifold block forms a hollow interior cavity 146. The interior cavity 146 has an inlet 148 for the manifold supply tube 144 at one side and four outlets 150 for the valve supply tubes 14, 16, 18, 20. The inlet 148 and outlets 150 are located on substantially flat and substantially vertical exterior surfaces of the intermediate manifold block 142. Preferably, the valve supply tubes 14, 16, 18, 20 and the manifold supply tube 144 are staked to the intermediate manifold block 142 as described above. The valve supply tubes 14, 16, 18, 20 horizontally extend at the same height from the intermediate manifold block to the burner valve assemblies 22, 24, 26, 28.

Figure 8:
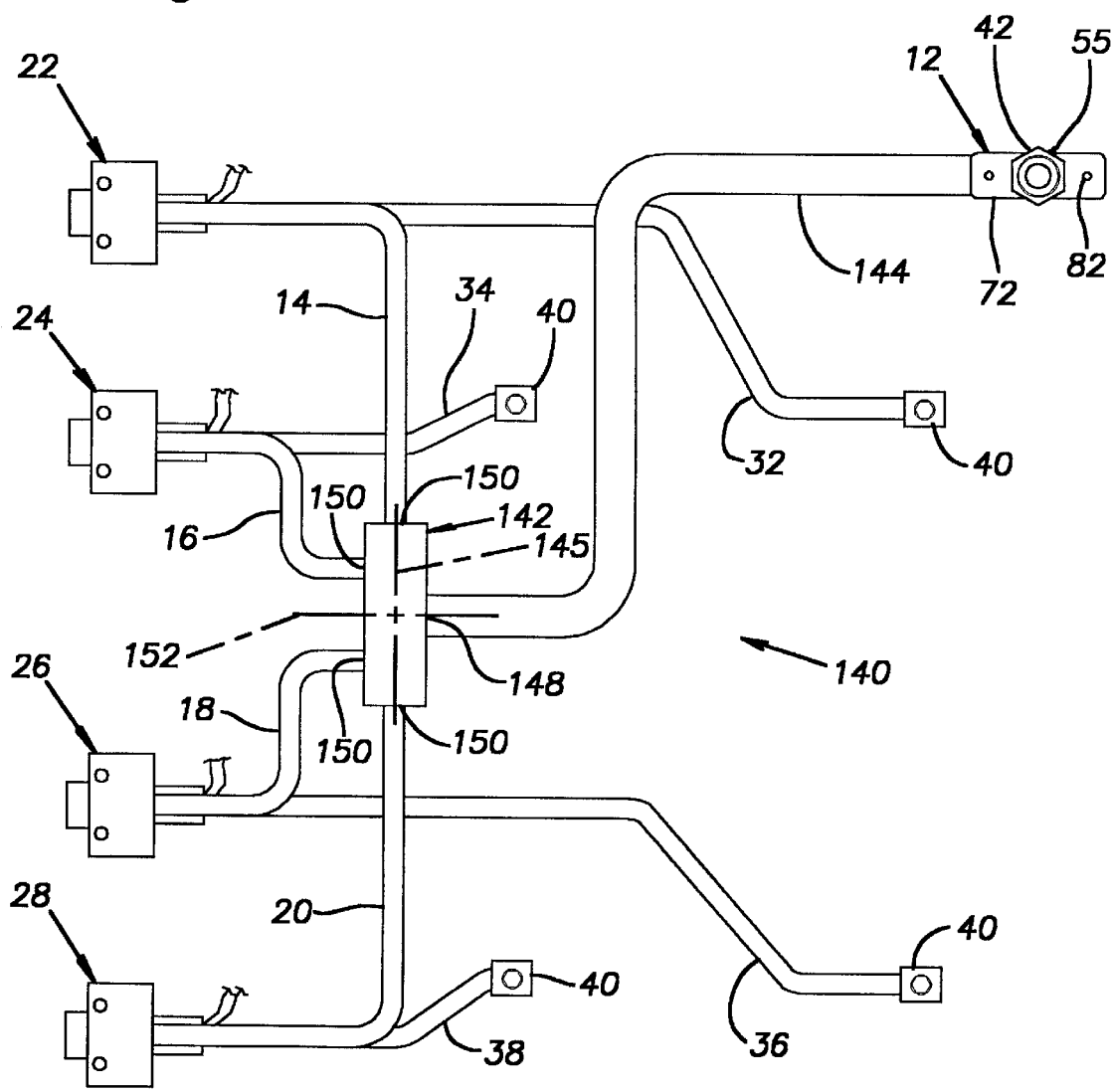
FIG. 8 is a bottom plan view of a tube assembly for a gas stove according to a variation of the tube assembly of FIG. 7.

A variation of the tube assembly 140 of FIG. 7 is shown in FIG. 8, wherein like reference numbers are used for like structure, and illustrates that the intermediate manifold block 142 can be located in various positions. The tube assembly 140 is the same as described above except that the intermediate manifold block 142 is centrally located so that the valve supply tubes 14, 16, 18, 20 are symmetrical about a longitudinal centerline 152 of the intermediate manifold block 142 which extend perpendicular to the central axis 145. It is noted that the manifold blocks 12, 142 are preferably positioned to avoid interference with access to other components of the gas range. The manifold supply tube 144 includes two bends to connect with the inlet 148 located at a rear side of the intermediate manifold block 142 at the centerline 152. The first and fourth valve supply tubes 14, 20 horizontally extend from the outlets 150 which are located at ends of the intermediate manifold block 142 and the second and third valve supply tubes 16, 18 horizontally extend from the outlets 150 which are located at a front side of the intermediate manifold block 142.

Although particular embodiments of the invention have been described in detail, it will be understood that the invention is not limited correspondingly in scope, but includes all changes and modifications coming within the spirit and terms of the claims appended hereto.

What is claimed is:

1. A tube assembly for a gas range having burners, said tube assembly comprising:
   a manifold block adapted for connection to a source of gas and formed of a lightweight material, said block has a polygonally-shaped outer-side surface;
   valve assemblies adapted to regulate flow of gas from said manifold block to the burners;
   supply tubes each having a first end connected to said polygonally-shaped outer-side surface of said manifold block and a second end connected to an inlet of an associated one of said valve assemblies;
   burner orifices adapted to control flow of gas to the burners; and
   burners tubes each having a first end connected to an outlet of one of said valve assemblies and a second end connected to an associated one of said burner orifices.

2. The tube assembly according to claim 1, wherein said manifold block is formed of an aluminum alloy.

3. The tube assembly according to claim 1, wherein said manifold block includes an extruded and machined body.

4. The tube assembly according to claim 1, wherein said supply tubes are directly staked to said substantially flat surface of said manifold block.

5. The tube assembly according to claim 1, wherein said supply tubes are formed of an aluminum alloy.

6. The tube assembly according to claim 1, wherein at least one of said supply tubes and said burner tubes are connected to said valve assemblies with a stake joint.

7. The tube assembly according to claim 6, wherein said supply tubes are connected to said valve assemblies with a stake joint and said burner tubes are connected to said valve assemblies with a stake joint.

8. The tube assembly according to claim 6, wherein said supply tubes are connected to said valve assemblies with a stake joint and said burner tubes are connected to said valve assemblies with a double-bead joint.

9. The tube assembly according to claim 6, wherein said supply tubes are connected to said valve assemblies with a stake joint and said burner tubes are connected to said valve assemblies with an o-ring joint.

10. The tube assembly according to claim 1, wherein at least one of said supply tubes and said burner tubes are connected to said valve assemblies with a double-bead joint.

11. The tube assembly according to claim 10, wherein said supply tubes are connected to said valve assemblies with a double-bead joint and said burner tubes are connected to said valve assemblies with a double-bead joint.

12. The tube assembly according to claim 10, wherein said supply tubes are connected to said valve assemblies with a double-bead joint and said burner tubes are connected to said valve assemblies with an o-ring joint.

13. The tube assembly according to claim 1, wherein at least one of said supply tubes and said burner tubes are connected to said valve assemblies with an o-ring joint.

14. The tube assembly according to claim 1, wherein said polygonally-shaped outer-side surface is a hexagon.

15. A tube assembly for a gas range having burners, said tube assembly comprising:
a manifold block adapted for connection to a source of gas and formed of a lightweight material;
valve assemblies adapted to regulate flow of gas from said manifold block to the burners;
supply tubes each having a first end connected to said manifold block and a second end connected to an inlet of an associated one of said valve assemblies;
burner orifices adapted to control flow of gas to the burners;
burners tubes each having a first end connected to an outlet of one of said valve assemblies and a second end connected to an associated one of said burner orifices;
another manifold block formed of a lightweight material and connecting said manifold block with said valve assemblies, and
a manifold supply tube having a first end connected to said manifold block and a second end connected to said another manifold block.

16. The tube assembly according to claim 15, wherein said another manifold block is formed of an aluminum alloy.

17. The tube assembly according to claim 15, wherein said another manifold block includes an extruded body.

18. The tube assembly according to claim 15, wherein said manifold supply tube is formed of an aluminum alloy.

19. The tube assembly according to claim 15, wherein said manifold supply tube is staked to said manifold block and staked to said another manifold block.

20. A tube assembly for a gas range having burners, said tube assembly comprising:
an aluminum manifold block having a polygonally-shaped outer-side surface, an inlet adapted for connection to a source of gas, and a plurality of outlets located on said polygonally-shaped outer-side surface;
valve assemblies adapted to regulate flow of gas from said manifold block to the burners;
aluminum supply tubes each having a first end staked to said polygonally-shaped outer-side surface at an associated one of said outlets of said manifold block and a second end connected to an inlet of an associated one of said valve assemblies;
burner orifices adapted to control flow of gas to the burners; and
aluminum burner tubes each having a first end connected to an outlet of an associated one of said valve assemblies and a second end connected to an associated one of said burner orifices.

21. The tube assembly according to claim 20, wherein said polygonally-shaped outer-side surface is a hexagon.

22. A tube assembly for a gas range having burners, said tube assembly comprising:
a first aluminum manifold block having an inlet adapted for connection to a source of gas and an outlet;
a second aluminum manifold block having an inlet and an outlet;
an aluminum manifold supply tube having a first end staked to said outlet of said first manifold block and a second end staked to said inlet of said second manifold block;
valve assemblies adapted to regulate flow of gas from said manifold block to the burners;
aluminum supply tubes each having a first end connected to an associated one of said outlets said second manifold block and a second end connected to an inlet of an associated one of said valve assemblies;
burner orifices adapted to control flow of gas to the burners; and
aluminum burner tubes each having a first end connected to an outlet of an associated one of said valve assemblies and a second end connected to an associated one of said burner orifices.

23. An igniter assembly for a gas range comprising:
a valve adapted to regulate the flow of gas to the burners;
a valve stem projecting from the valve to adjust the amount of flow therethrough, said valve stem being rotatable about a rotational axis;
a pin extending from said valve stem and rotatable therewith, said pin being generally perpendicular to said rotational axis;
an inlet in the valve to receive a supply tube of gas;
an outlet in the valve for connecting a burner tube; and
an igniter sensor having a notch for receiving said pin upon rotation of said valve stem, whereby said igniter sensor senses the position of the valve stem and sends a signal to a spark module at a predetermined position of the valve stem.

24. The igniter assembly of claim 23, wherein the igniter sensor is contactless with the valve stem and pin but receives a signal from it.

25. The igniter assembly according to claim 24, wherein the igniter sensor is one of a hall-effect sensor, a tuned R.F. circuit, an inductance circuit and a capacitance circuit.

26. The igniter assembly of claim 23, further comprising a common supporting bracket for said valve and said igniter sensor, wherein the igniter sensor has tabs that snap into said supporting bracket.

* * * * *

UNITED STATES PATENT AND TRADEMARK OFFICE
CERTIFICATE OF CORRECTION

PATENT NO. : 5,851,110
DATED : December 22, 1998
INVENTOR(S) : Ralph G. Ridenour It is certified that error appears in the above-indentified patent and that said Letters Patent is hereby corrected as shown below:

Column 2, line 2, please delete "value" and insert therefor --valve--;

Column 4, line 12, please delete "No." and insert therefor --Nos.--; and

Column 9, line 58, claim 20, please delete "of said manifold block".

Signed and Sealed this

Fifteenth Day of August, 2000

Attest:

Q. TODD DICKINSON

Attesting Officer

Director of Patents and Trademarks